(12) United States Patent
Mierau

(10) Patent No.: US 6,374,530 B1
(45) Date of Patent: Apr. 23, 2002

(54) GOOSE DECOY

(76) Inventor: Craig A. Mierau, 322 E. 4th St., Grand Island, NE (US) 68801

( * ) Notice: Subject to any disclaimer, the term of this patent is extended or adjusted under 35 U.S.C. 154(b) by 0 days.

(21) Appl. No.: 09/631,644

(22) Filed: Aug. 2, 2000

(51) Int. Cl.⁷ .............................. A01M 31/06
(52) U.S. Cl. .................................. 43/3; 43/2
(58) Field of Search ........................... 43/2, 3

(56) References Cited

U.S. PATENT DOCUMENTS

| | | | |
|---|---|---|---|
| 2,439,167 A | | 4/1948 | Jackson ............... 43/3 |
| 2,799,961 A | * | 7/1957 | Jaumotte ............. 43/3 |
| 3,245,168 A | | 4/1966 | Pool .................. 43/3 |
| 3,350,808 A | * | 11/1967 | Mitchell ............. 43/3 |
| 3,470,645 A | * | 10/1969 | Mattson .............. 43/3 |
| 3,707,798 A | | 1/1973 | Tryon ................ 43/3 |
| D229,177 S | | 11/1973 | Schwartztrauber ...... D22/5 |
| 3,800,457 A | | 4/1974 | Barrett .............. 43/3 |
| 4,611,421 A | * | 9/1986 | Jacob ................ 43/3 |
| 4,816,002 A | | 3/1989 | Brodrib .............. 446/373 |
| 4,845,872 A | | 7/1989 | Anderson ............. 43/3 |
| 4,928,418 A | | 5/1990 | Stelly ............... 43/3 |
| 5,168,649 A | | 12/1992 | Wright ............... 43/2 |
| 5,172,506 A | * | 12/1992 | Tiley et al. ......... 43/3 |
| 5,189,823 A | * | 3/1993 | Lanius ............... 43/3 |
| 5,279,063 A | | 1/1994 | Heiges ............... 43/3 |
| 5,375,363 A | * | 12/1994 | Higdon ............... 43/3 |
| 5,392,554 A | | 2/1995 | Farstad et al. ....... 43/3 |
| 5,572,823 A | | 11/1996 | Savaria .............. 43/2 |
| 5,595,012 A | * | 1/1997 | Coleman .............. 43/3 |
| 5,762,531 A | | 6/1998 | Witkin ............... 446/374 |
| 5,983,552 A | | 11/1999 | Nelson ............... 43/2 |

\* cited by examiner

*Primary Examiner*—Kurt Rowan
(74) *Attorney, Agent, or Firm*—Thomte, Mazour & Niebergall; Dennis L. Thomte

(57) ABSTRACT

A goose decoy is disclosed comprising a body frame having a neck frame selectively removably secured thereto. The body frame and the neck frame are comprised of flexible steel banding material so that the body frame and neck frame will move due to wind action thereagainst. The neck frame is covered by a neck sock while the body frame is covered by a body sock. The neck and body socks are comprised of a fabric material imprinted with the colorings of a goose. A stake is inserted upwardly through the body of the decoy and is secured to the body frame to support the decoy in various positions.

15 Claims, 5 Drawing Sheets

GOOSE DECOY

BACKGROUND OF THE INVENTION

1. Field of the Invention

This invention relates to a goose decoy and more particularly to a goose decoy including a "spring-like" frame so that the decoy reacts to wind, thereby creating movement therein.

2. Description of the Related Art

Many types of goose decoys have been previously designed. Some of the prior art goose decoys are "full-bodied" which makes them difficult to transport from one location to another due to the bulk thereof. Other types of prior art goose decoys have been provided which are comprised of flat, rigid panels, but those types of decoys lack the necessary realistic appearance of a live goose. Further, many of the prior art goose decoys to not have the ability to employ interchangeable heads so that the decoy spread may have geese in the sentry position, feeding position, resting position, etc. Additionally, many of the prior art goose decoys lack the necessary strength and durability.

SUMMARY OF THE INVENTION

A goose decoy is disclosed which includes a substantially vertically disposed body frame consisting of an elongated, flat, flexible band member formed to define a tail portion, a back portion, a breast portion, and an abdomen portion. A head frame is selectively removably secured to the body frame adjacent the breast portion and the back portion of the back member. An elongated stake is selectively removably secured to the body frame for insertion into the ground to support the body frame. A first fabric material or sock encloses the body frame with the sock being imprinted with the body coloring of a goose. A second fabric material consisting of a sock or the like encloses the head frame and is imprinted with the neck and head coloring of a goose. The head frame may take various shapes such as a 90° feeder, 45° feeder, resting, sentry, talking and sleeping, as well as a head position looking right or left. Feet may also be selectively secured to the body frame if desired. When the wind blows, the band member of the body frame reacts thereto to create movement in the decoy thereby providing a realistic decoy. The head frame also reacts to the wind to create a bobbing effect for the head of the decoy. Further, the fabric socks also react to wind which tends to create feather-like movement on the decoy. The decoy is easily transportable and is easily assembled.

It is therefore a principal object of the invention to provide an improved goose decoy.

A further object of the invention is to provide a goose decoy which moves with the wind.

Yet another object of the invention is to provide a goose decoy which maintains its position even in high winds.

A further object of the invention is to provide a goose decoy which utilizes fabric to provide flexibility to the body, somewhat like feather movement.

Still another object of the invention is to provide a goose decoy where different species of body socks may be mounted on the body frame.

Still another object of the invention is to provide a goose decoy having interchangeable heads Yet another object of the invention is to provide a goose decoy whereby the body and head position may be easily changed.

Still another object of the invention is to provide a goose decoy which is easily transportable in either the unassembled or partially assembled condition.

Yet another object of the invention is to provide a goose decoy which is easily stored.

Yet another object of the invention is to provide a goose decoy wherein ice and snow build-up is easily removed.

These and other objects will be apparent to those skilled in the art.

DESCRIPTION OF THE PREFERRED EMBODIMENT

Figure 1:
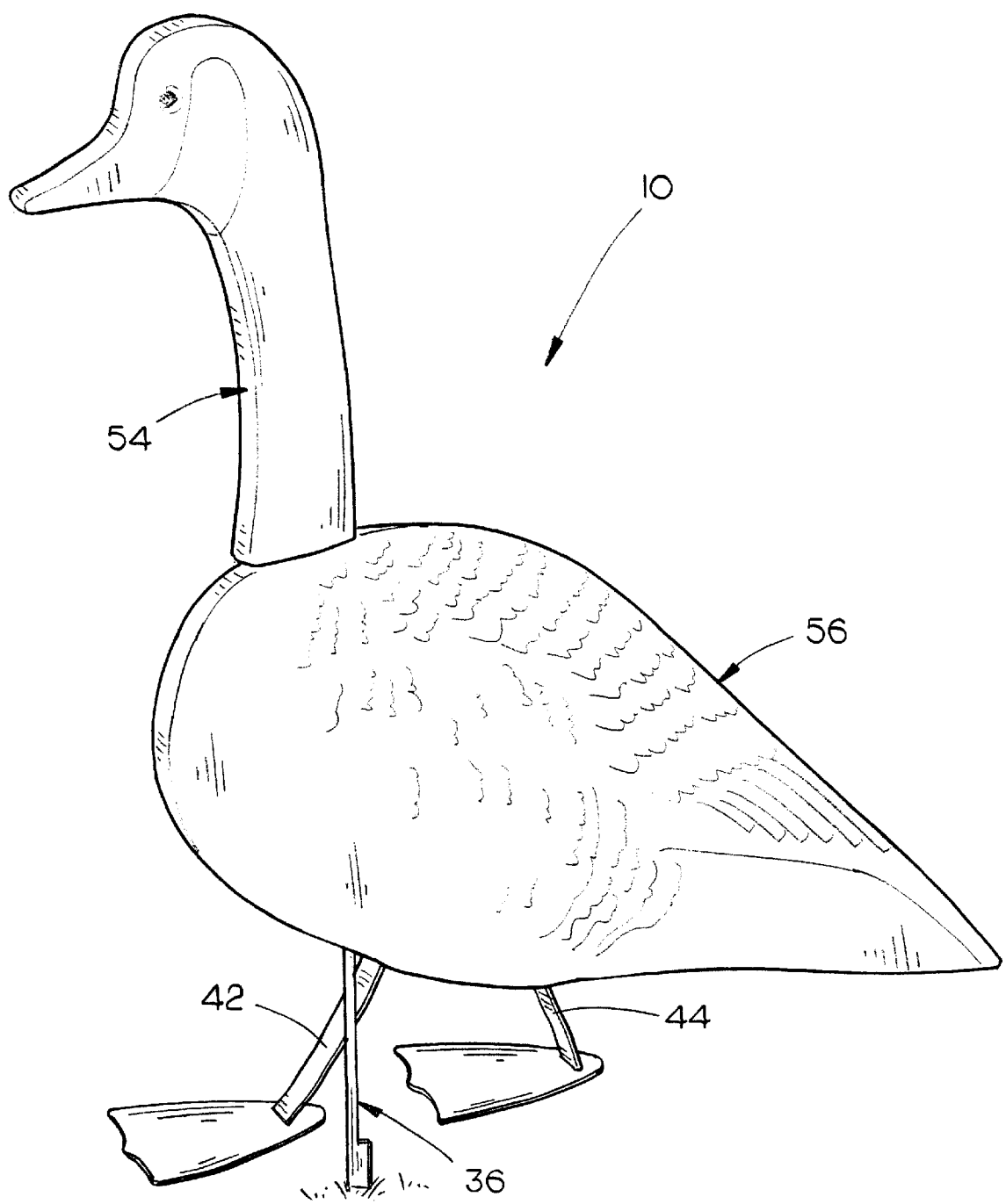
FIG. 1 is a perspective view of the goose decoy of this invention.

The goose decoy of this invention is referred to generally by the reference numeral 10. FIG. 1 illustrates the assembled goose decoy with a "sentry" head mounted thereon, as will be described in greater detail hereinafter. FIG. 1 also illustrates the goose decoy with optional feet, as will also be described in more detail hereinafter.

Decoy 10 includes a body frame 12 which is comprised of a flexible, flat band member 14 which is preferably comprised of ¾ inch wide steel banding material with an approximate thickness of 0.020 inches. For purposes of description, band 14 will be described as comprising ends 14A and 14B. Clip 16 is clipped onto the end of end 14A of band 14 and is adapted to have end 14B frictionally and removably received therein to maintain the body frame 12 in the position illustrated in FIG. 2. A head clip 18 is selectively slidably mounted on band member 14, as seen in the drawings. If the optional feet for the decoy are to be used, a clip 20 is selectively slidably mounted on band member 14, as also seen in FIG. 2.

Figure 2:
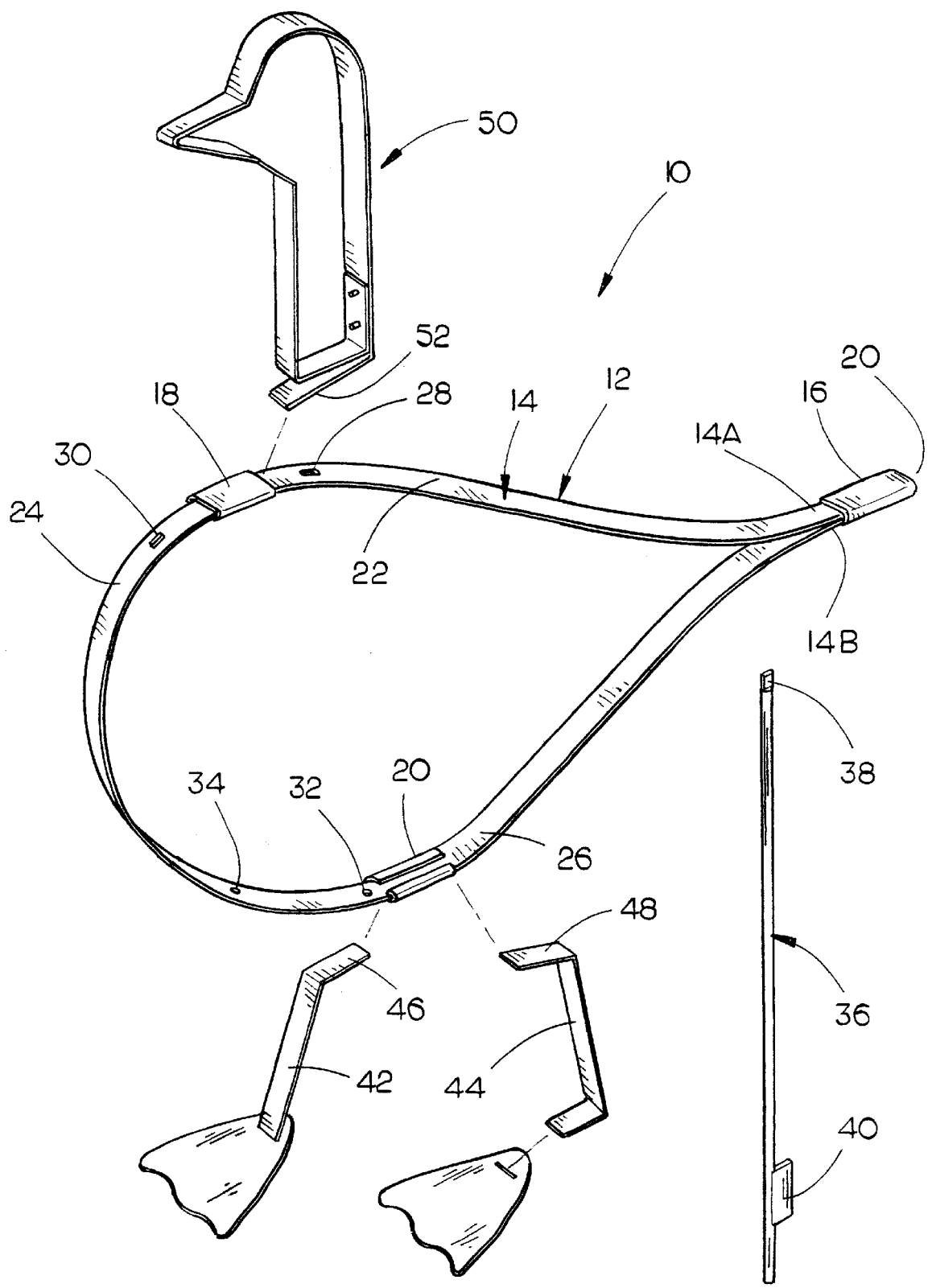
FIG. 2 is a perspective view of the framework, supporting stake and feet of the goose decoy.
Figure 3:
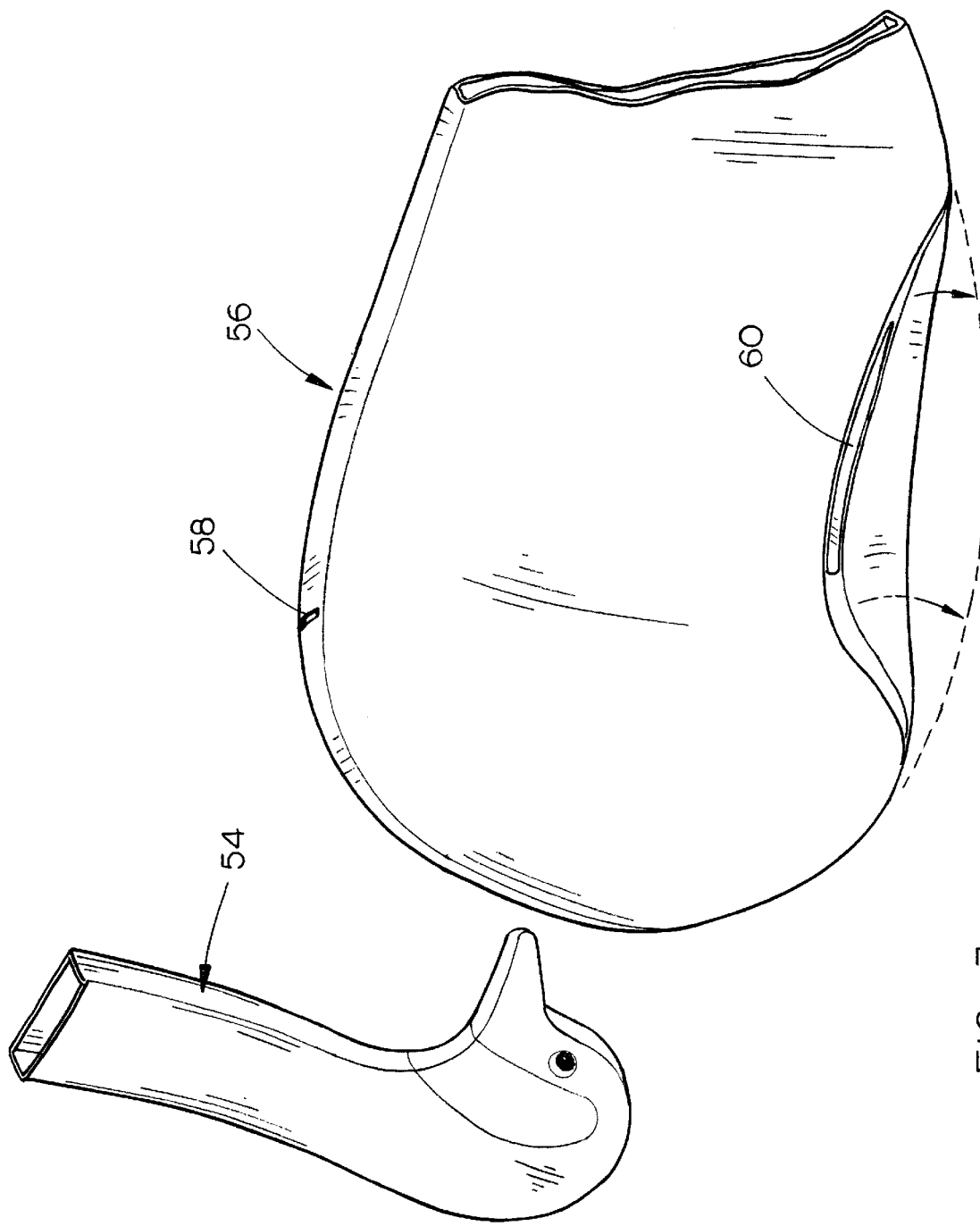
FIG. 3 is a perspective view of the head and body socks.

When end 14B is received in clip 16, as illustrated in FIG. 2, the body frame 12 defines a tail portion 20, back portion 22, breast portion 24, and abdomen portion 26. A pair of spaced-apart rectangular openings 28 and 30 are formed in band member 14, as seen in FIG. 2, and a pair of circular openings 32 and 34 are formed in band member 14, as also seen in FIG. 2. The numeral 36 refers to a stake having a rectangular portion 38 at its upper end and a baffle 40 adjacent its lower end. Stake 36 may be extended upwardly through opening 32 so that end 38 is received in opening 28 to maintain the body frame 12 in a substantially vertically disposed position. Stake 36 may also be extended upwardly through opening 34 so that end 38 may be received in opening 30 to vary the attitude of the body frame as desired. When the stake 36 is inserted into the ground, the baffle 40 prevents the stake 36 and the body frame 12 from being rotated due to wind conditions.

Figure 4:
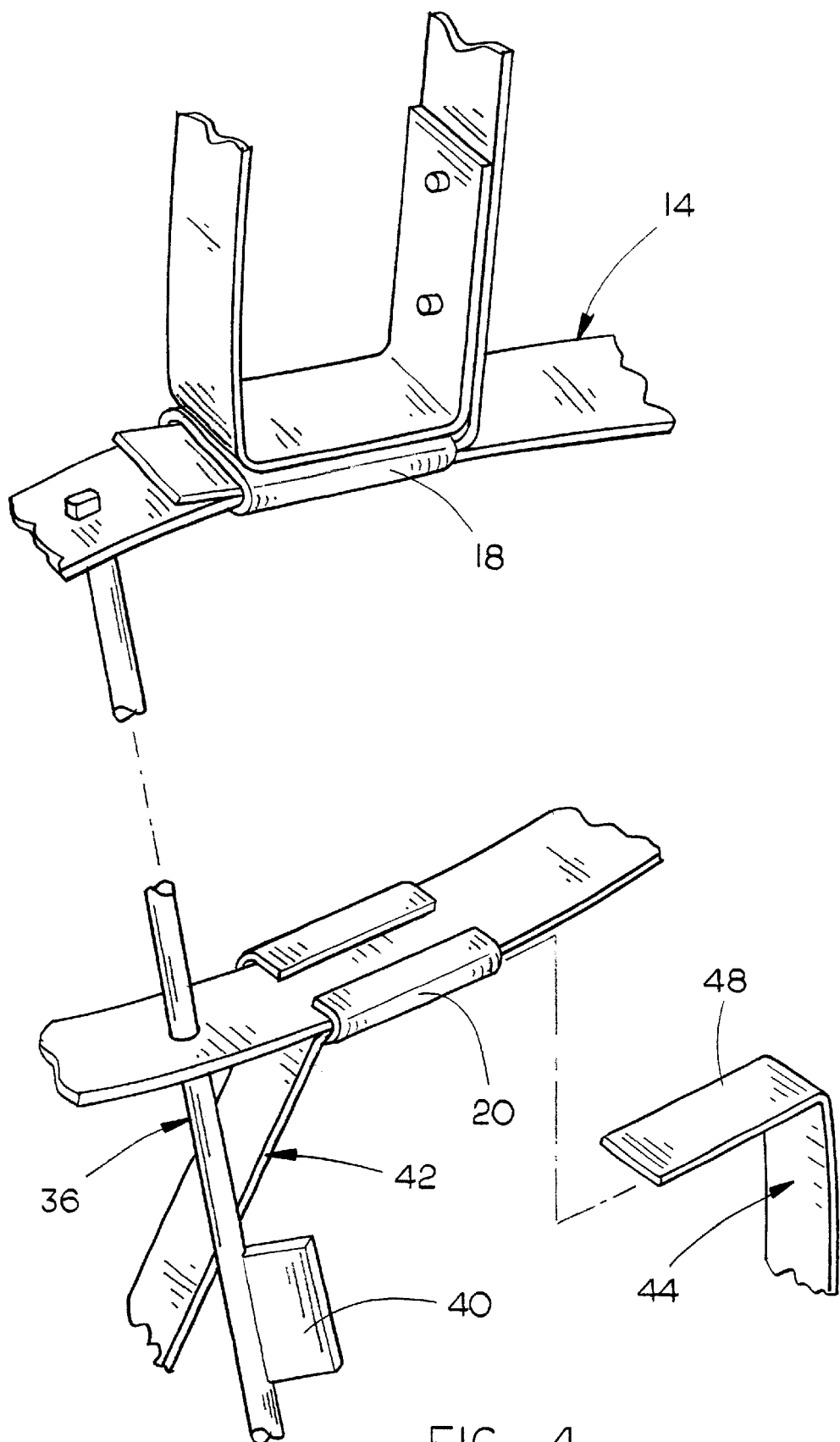
FIG. 4 is a partial perspective view illustrating portions of the framework and supporting stake.

A pair of optional feet 42 and 44 may be mounted on the body frame 12 by inserting the upper ends 46 and 48 thereof, respectively, into the forward and rearward ends of the clip 20, as illustrated in FIG. 2 and in FIG. 4.

Figure 5A:
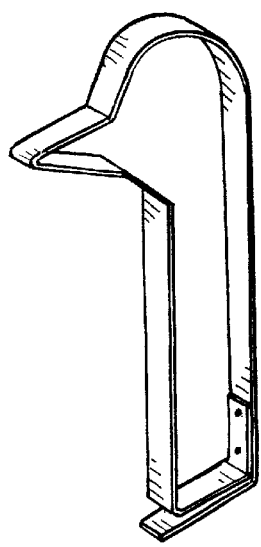
FIG. 5A is a perspective view of the head frame of the sentry goose decoy.
Figure 5B:
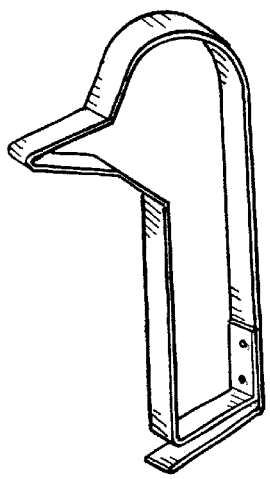
FIG. 5B is a perspective view of the head frame of a resting goose decoy.
Figure 5C:
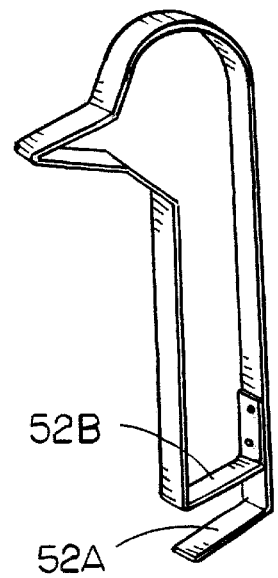
FIG. 5C is a view similar to FIG. 5A except that the mounting means provides somewhat more movement to the head frame.
Figure 5D:
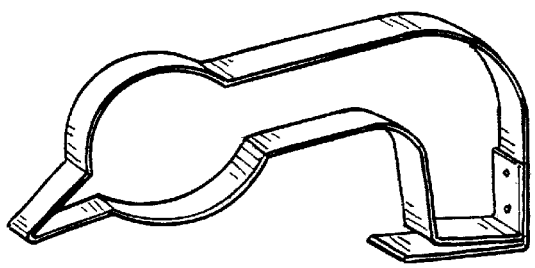
FIG. 5D is a perspective view of a feeding goose decoy.
Figure 5E:
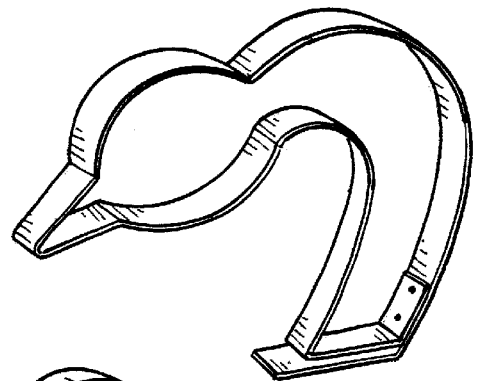
FIG. 5E is a perspective view of the head frame of a talking goose decoy.
Figure 5F:
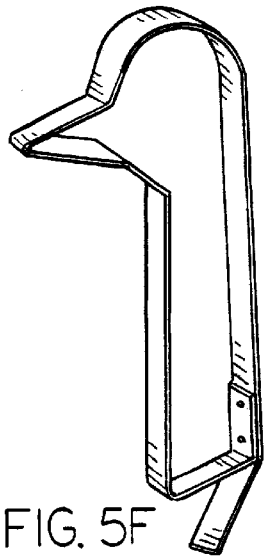
FIG. 5F is a perspective view of the head frame of a right-looking goose decoy.
Figure 5G:
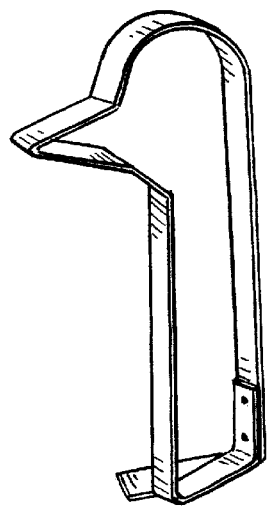
FIG. 5G is a perspective view of the head frame of a left-looking goose decoy.

The numeral 50 refers to a head frame which is also comprised of a band material such as band member 14 and which is bent to define the neck and head of a goose. Head frame 50 includes a lower end portion 52 which may be slidably inserted between clip 18 and band member 14 to maintain head frame 50 in position. FIGS. 5A–5G illustrate various head frame configurations so that the decoy may be modified to a sentinel decoy, feeding decoy, resting decoy, etc. FIG. 5C illustrates a head frame wherein the lower end 52A is spaced a greater distance from the cross member 52B so that the head will have a greater ability to bob in the wind.

The numeral 54 refers to a fabric sock preferably comprised of a 50—50 polyester-cotton mixture which is screen printed with the head and neck colorings of a goose. Sock 54 is slipped over the head frame 50 with the lower end portion 52 protruding from the lower end of the sock to enable the lower end portion 52 to be secured to the clip 18. The numeral 56 refers to a body sock which embraces the body frame 12, as will be described hereinafter. Body sock 56 is also preferably constructed of a 50—50 polyester-cotton mixture which has been screen printed with the details of the body of a goose. The upper end of body sock 56 is provided with a slit 58 which will be positioned over the clip 18 to enable the lower end portion 52 of head frame 50 to be inserted through the slit 58 for insertion into the clip 18. Normally, the slit 58 will be created by the individual hunter to enable the hunter to position head frame 50 as he/she desires. Body sock 56 is also provided with an elongated opening 60 at the lower end thereof to enable the feet 42 and 44 to be inserted therethrough if the feet are utilized and to enable the stake 36 to be inserted upwardly therethrough for engagement with the body frame 12.

When the decoy 10 is disassembled, the body frame 12 may be either stored in the position illustrated in FIG. 2 or the end 14B may be removed from the clip 16 so that the band member 14 will be in a substantially flat position for storage. The various components are taken to the field in either a disassembled or partially assembled condition. Assuming that the decoy is completely disassembled, the first step in the assembly of the goose decoy will be to bend the band member 14 to the position of FIG. 2 so that the end 14B is received by clip 16 to maintain the band member 14 in the shape illustrated in FIG. 2. The band member 14 is then grasped by the hunter near the tail end thereof to move the upper and lower portions of the band member towards one another so that the body frame 12 may be inserted into the interior of the body sock 56 through the opening 60. Once the tail portion 20 of the body frame 12 is received by the tail portion of the body sock 56, the body frame 12 is "rolled" into the interior of the body sock 15 so that the body sock 56 will assume the shape illustrated in FIG. 1. Any one of the head frames illustrated in the drawings, having a head sock 54 received thereon, may then be secured to the body frame 12 by inserting the lower end portion 52 of the head frame 50 through the slit 58 for connection to the clip 18. The stake 36 may then be inserted upwardly through the opening 60 for connection to the body frame 12. If feet are being used on the decoy, they also would be partially inserted through the opening 60 for connection to the clip 20.

When the decoy is in place, the wind action thereagainst causes the sock 54 and the body sock 56 to ripple somewhat, thereby giving the appearance of feather movement on the decoy to enhance the realistic appearance thereof. Further, wind action against the decoy causes the flexible body frame 12 to flex and move further giving realistic movement to the decoy. Wind action against the head of the decoy causes the head to bob up and down somewhat due to its flexible characteristics and due to its flexible connection to the body frame.

The fact that many different types of necks may be attached to the decoy enables the decoy spread to be varied so that certain of the decoys are sentinels, resting, feeding, etc. The fact that the fabric covers the frames enables snow and ice to be quickly and easily brushed or removed therefrom. The coloring on the body and neck socks may be varied for different types of goose species, such as snow geese, blue geese, etc.

Thus it can be seen that the invention accomplishes at least all of its stated objectives.

I claim:

1. A goose decoy, comprising:
a substantially vertically disposed body frame comprising an elongated, flat, flexible band member formed to define a tail portion, a back portion, a breast portion, and an abdomen portion; said band member having two ends which are operatively connected to form said body frame,
a head frame selectively removably secured to said body frame adjacent said breast portion and said back portion;
an elongated stake selectively removably secured to said body frame for insertion into the ground to support said body frame;
a first fabric material enclosing said body frame which is imprinted with the body coloring of a goose;
and a second fabric material enclosing said head frame which is imprinted with the head and neck coloring of a goose.

2. The goose decoy of claim 1 wherein said head frame is comprised of an elongated, flat band member formed to define a neck portion, a head portion, and a bill portion.

3. The goose decoy of claim 1 wherein said head frame is selectively adjustably mounted on said body frame.

4. The goose decoy of claim 1 wherein said head frame is shaped to resemble the head and neck of a sentinel goose.

5. The goose decoy of claim 1 wherein said head frame is shaped to resemble the head and neck of a feeding goose.

6. The goose decoy of claim 1 wherein at least one leg member is selectively removably secured to said body frame.

7. The goose decoy of claim 6 wherein a clip member is mounted on said body frame and wherein said leg member is secured to said clip member.

8. The goose decoy of claim 1 wherein said stake extends upwardly through said abdomen portion of said body frame and is secured to said back portion of said body frame.

9. The goose decoy of claim 8 wherein said stake includes anti-rotation means to prevent rotation of said stake with respect to the ground.

10. The goose decoy of claim 8 wherein said stake includes anti-rotation means to prevent rotation of said body frame with respect to said stake.

11. The goose decoy of claim 1 wherein said body frame is substantially teardrop-shaped.

12. The goose decoy of claim 1 wherein said band member is comprised of a spring steel material.

13. A goose decoy, comprising:

a substantially vertically disposed body frame comprising an elongated, flat, flexible band member formed to define a tail portion, a back portion, a breast portion, and an abdomen portion;

a head frame selectively removably secured to said body frame adjacent said breast portion and said back portion;

an elongated stake selectively removably secured to said body frame for insertion into the ground to support said body frame;

a first fabric material enclosing said body frame which is imprinted with the body coloring of a goose;

a second fabric material enclosing said head frame which is imprinted with the head and neck coloring of a goose; and a clip member selectively slidably mounted on said body frame;

said head frame including a flat attachment portion which is selectively positioned between said clip member and said body frame to selectively attach said head frame to said body frame.

14. The goose decoy of claim 13 wherein said first fabric material has a first opening formed therein to enable said flat attachment portion of said head frame to be extended therethrough for attachment to said clip member.

15. The goose decoy of claim 14 wherein said body frame may be inserted into the interior of said fabric material through said first opening.

* * * * *